United States Patent [19]
Dennis

[11] 3,984,694
[45] Oct. 5, 1976

[54] PULSE WIDTH REGULATOR FOR A PULSED NEUTRON SOURCE

[75] Inventor: Charles L. Dennis, Dallas, Tex.

[73] Assignee: Mobil Oil Corporation, New York, N.Y.

[22] Filed: Feb. 13, 1975

[21] Appl. No.: 549,622

[52] U.S. Cl. .............................. 250/502; 250/286; 328/112
[51] Int. Cl.[2] ......................................... G21G 4/02
[58] Field of Search ............ 328/112, 111; 250/502, 250/496, 286, 502, 286; 307/234

[56] References Cited
UNITED STATES PATENTS

| | | | |
|---|---|---|---|
| 3,151,243 | 9/1964 | Mott | 250/501 |
| 3,500,369 | 3/1970 | Kellam | 328/112 |
| 3,657,539 | 4/1972 | Pierson | 250/502 |
| 3,719,827 | 3/1973 | Dennis | 250/502 |
| 3,760,281 | 9/1973 | Hogg | 328/112 |

Primary Examiner—Harold A. Dixon
Attorney, Agent, or Firm—C. A. Huggett; George W. Hager, Jr.

[57] ABSTRACT

A pulsed neutron system includes an accelerator tube having a target, an ionization section, and a replenisher for supplying accelerator gas. The power supplied to the replenisher is controlled to maintain the ionization pulse time duration within the upper and lower limits of a time window. A comparator compares the ionization pulse time duration to the upper and lower limits of the time window and produces an output pulse which is utilized by an operational amplifier to operate a stepping motor in one direction if the ionization pulse time duration exceeds the upper limit of the time window and in a reverse direction if the ionization pulse time duration is below the lower limit of the time window. The stepping motor positions a variable autotransformer which increments the voltage applied to the replenisher to change the ionization pulse time duration if it does not fall within the upper and lower limits of the time window.

8 Claims, 3 Drawing Figures

PULSE WIDTH REGULATOR FOR A PULSED NEUTRON SOURCE

BACKGROUND OF THE INVENTION

In the art of radioactive assay well logging, an assay tool is lowered into the borehole to a level of a formation to be assayed. The assay operation is then carried out by cyclically operating a neutron source so as to irradiate the formation with bursts of neutrons, the time between each burst being sufficient to allow the neutrons from the source to disappear and to allow delayed fission neutrons emitted by the formation to arrive at and be detected by a neutron detector. U.S. Pat. No. 3,686,503 to Givens, Caldwell, and Mills, Jr., describes such a system.

A pulsed neutron generator for such a system commonly takes the form of a three-element, linear accelerator tube. It includes a replenisher element which is electrically heated to boil off deuterium gas absorbed by the filament. The deuterium molecules are ionized by an ionizing section which commonly includes plates to which a positive ionization pulse is applied. The deuterium ions are then accelerated and bombard a target which included tritium molecules. The bombardment of the deuterium ions on the tritium molecules yields helium plus a supply of neutrons. One commercially available tube which is capable of such operation is the Kaman Nuclear Model A-801 Neutron Generator.

In operating such a tube it is important that the power supplied to the replenisher be correctly adjusted so that the proper amount of accelerator gas, deuterium, as described above, boils off the replenisher element. If the replenisher is overheated, too much accelerator gas boils off. In this case, ion recombination takes place in the tube. Also, arcing in the tube shortens the tube life and neutron output falls off. If too little power is supplied to the replenisher, there is not enough accelerator gas available in the tube to provide a good neutron output.

The adjustment of the power supply to the replenisher is complicated by the fact that the characteristics of the tube change as the tube ages. That is, after the tube has been in use, a greater amount of power must be supplied to the replenisher to boil off the same amount of accelerator gas. U.S. Pat. No. 3,719,827 to Charles L. Dennis describes a system in which the power supply to the replenisher element in a linear accelerator tube is automatically controlled. In this system, the time duration of the ionization pulse is compared to a reference pulse, and a control signal generated. The control signal is applied to a stepping motor. Each time the accelerator tube is ionized, the motor is advanced in one direction or the other, depending upon the comparison of the ionization pulse to the reference pulse. This motor increments a variable, autotransformer which supplies power to the replenisher. In this manner the replenisher power is adjusted to supply the correct amount of accelerator gas to the tube.

SUMMARY OF THE INVENTION

In accordance with the present invention, the output of an accelerator tube employed in a pulsed neutron logging system is controlled by monitoring the ionization time of the accelerator gas, establishing a time window having a lower and upper limit, increasing the power supply to the replenisher element of the accelerator tube upon the ionization time exceeding the upper limit of the time window, and decreasing the power supplied to the replenisher element upon the ionization time falling below the lower limit of the time window. More particularly, first and second reference pulses are generated in response to each ionization pulse. The time duration of the first reference pulse is greater than the time duration of the second reference pulse. The ionization pulse is compared with both the first and second reference pulses; and a control signal is generated having a first state when the time duration of the ionization pulse exceeds the time duration of the first reference pulse, having a second state when the time duration of the ionization pulse is less than the time duration of the second reference pulse, and having a third state when the time duration of the ionization pulse is less than the time duration of the first reference pulse and exceeds the time duration of the second reference pulse. The first state of the control signal causes the power supplied to the replenisher element to be increased, thereby shortening the time duration of the ionization pulse. The second state of the control signal causes the power supplied to the replenisher element to be decreased, thereby lengthening the time duration of the ionization pulse. During the presence of the third state of the control signal, constant power is maintained to the replenisher element and the time duration of the ionization pulse is unchanged.

DESCRIPTION OF THE PREFERRED EMBODIMENT

Figure 1:
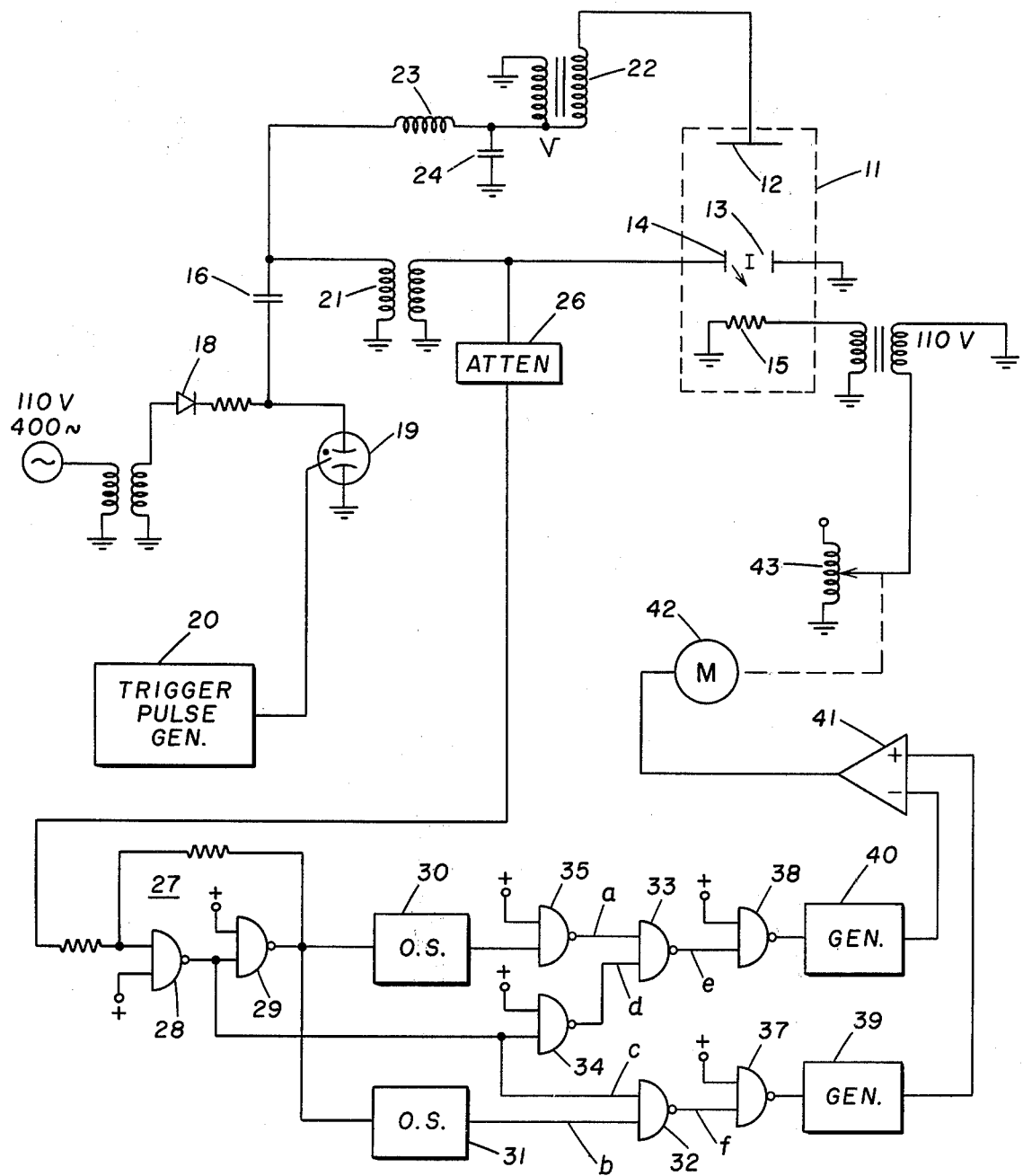
FIG. 1 is a circuit diagram schematic of the regulator system of the present invention for use in the control of the replenisher element of an accelerator tube in a pulsed neutron system.

Referring to FIG. 1, the pulsed neutron system includes an accelerator tube 11 having a target 12, an ionization section including plates 13 and 14, and a replenisher 15 for supplying accelerator gas.

Deuterium ions emitted by the replenisher are ionized by a +5 kilovolt ionization pulse applied across the plates 13 and 14. The deuterium ions are accelerated toward the target 12 by a −120 kilovolt pulse applied to the target. Energy for the production of these pulses is stored in the storage capacitor 16. This energy is generated by a 110-volt, 400-cycle source which is connected to the primary of the transformer 17. The secondary winding of transformer 17 produces a voltage of approximately 3 to 5 kilovolts. This voltage is rectified as indicated by the halfwave rectifying diode 18. The rectified voltage is applied to the storage capacitor 16 which is periodically discharged by a switch. The switch includes the xenon-filled triggerable spark gap 19. A trigger pulse generator 20 generates the trigger pulses which fire the spark gap 19 at periodic intervals, the interval being two pulses per second in one embodiment of the invention.

Each time the spark gap 19 is triggered, the energy stored in capacitor 16 is applied to the primaries of transformers 21 and 22. The secondary winding of the transformer 21 produces a positive 5-kilovolt ionization pulse which is applied to the plates 13 and 14 to ionize the accelerating gas in the tube. These positive ions are then accelerated toward the target 12 by a −120 kilovolt acceleration pulse applied to the target. Since the ionization process requires a finite amount of time, whereas the acceleration is relatively instantaneous, the acceleration pulse is delayed from the ionization pulse. A delay line 23 provides approximately a 7-microsecond delay for the acceleration pulse relative to the ionization pulse. The delay line 23 also acts as a tuned circuit which capacitor 24. This circuit is tuned to most efficiently transfer energy from the storage capacitor 16 to the target 12 of the tube.

In accordance with the present invention there is provided a new and improved regulator circuit for regulating the power supplied to the relenisher 15 of the accelerator tube 11. If the replenisher 15 boils off an over abundance of accelerator gas, the time required for the ionization pulse to ionize the accelerator gas will be shorter. On the other hand, if there is not sufficient accelerator gas supplied from the replenisher, the time required for the ionization pulse to ionize the accelerator gas will be increased. It is a specific aspect of the present invention to adjust the power supplied to the replenisher to regulate the amount of accelerator gas being provided by the replenisher so that the ionization pulse has a time duration sufficient to ionize the accelerator gas within a time window having upper and lower limits about the nominal time duration of the tube. In the case of the preferred embodiment utilizing the Kaman tube referred to previously, the nominal time duration is approximately 3 microseconds. Accordingly, in one embodiment, a preferable time window would range from 2 to 4 microseconds. If the ionization time drop below the lower limit of the time window, for example, 2 microseconds, the regulator supplies an output pulse to decrease the power supplied to the replenisher 15 of the accelerator tube and thereby increase the ionization time to exceed the 2-microsecond lower limit. If the ionization time should become greater than the upper limit of the time window, for example, 4 microseconds, the regulator supplies an output pulse to increase the power supplied to the replenisher 15 of the accelerator tube and thereby reduce the ionization time to less than the 4-microsecond upper limit.

In this embodiment of the present invention, the power being supplied to the replenisher 15 is not continuously adjusted after each firing of the accelerator tube but is adjusted only when the ionization time is outside the limits of the time window. In this manner, better accelerator gas regulation is maintained and less motor fatigue established than if the power to the replenisher 15 were adjusted after each firing of the accelerator tube.

The regulator circuit for accomplishing the foregoing described regulation includes an attenuator 26 for attenuating each ionization pulse to a level which can be accommodated by digital logic circuits. That is, the attenuator may be thought of as generating an ionization pulse having the same time duration as the ionization pulse from the attenuator 26 is a positive-going pulse applied to the Schmidtt trigger 27 comprising two NAND gates 28 and 29, each of which operates as an inverter and produces a square pulse having a time duration which is the same as the time duration of the ionization pulse. The output of NAND gate 28 is a negative-going pulse, while the output of NAND gate 29 is a positive-going pulse. The output of gate 29 is applied to one-shot multivibrators 30 and 31. Reference pulses are produced by both these multivibrators each time the accelerator tube is fired and an ionization pulse produced. The reference pulse from multivibrator 30 establishes the upper limit of a time window for the ionization pulse, while the multivibrator 31 establishes a lower limit of the time window for the ionization pulse. In a preferred embodiment, the multivibrator 30 produces a reference pulse that is 4 microseconds in duration, while the multivibrator 31 produces a reference pulse that is 2 microseconds in duration.

Figure 2:
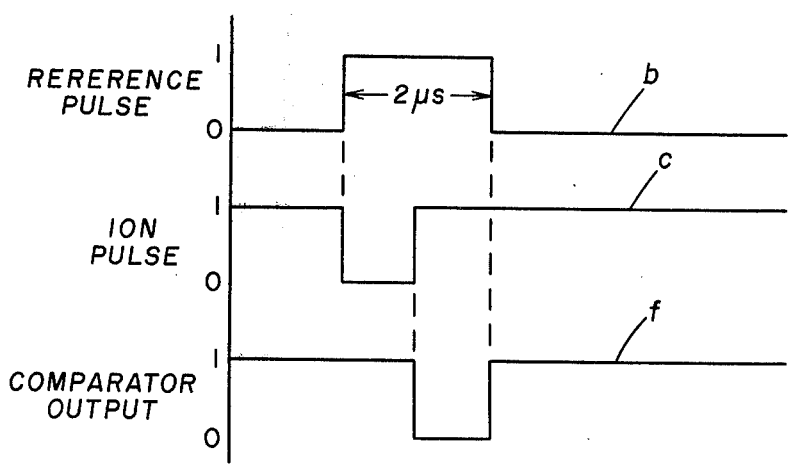

The lower time limit reference pulse produced by the one-shot multivibrator 31 is applied as one input to comparator 32. The negative-going pulse from NAND gate 28, representing the time duration of the ionization pulse, is applied to the other input of comparator 32, these two input signals being represented by the waveforms $b$ and $c$, respectively, in FIG. 2. Comparator 32 operates to provide an output, as indicated by the waveform $f$ in FIG. 2, which is a negative-going pulse only when the time duration of the negative-going ionization pulse $c$ is less than the 2-microsecond time duration of the positive-going reference pulse $b$.

The negative-going output pulse $f$ from comparator 32 is applied by way of inverter 37 to the trigger input of pulse generator 39. In response to pulse $f$, generator 39 provides a positive-going output pulse to the noninverting input of operational amplifier 41. Operational amplifier 41 responds to pulse $f$ to produce a positive-going control signal indicating that the time duration of the ionization pulse is below the lower limit of the time window established by the multivibrator 31.

This positive-going control signal is applied to a permanent-magnet, d-c stepping motor 42. The motor 42 responds to the positive-going control signal to drive a variable autotransformer 43 in a direction which decreases the power applied from a 110-volt, a-c supply to the replenisher 15 of the accelerator tube 11, thereby increasing the ionization time of the accelerator gas.

Figure 3:
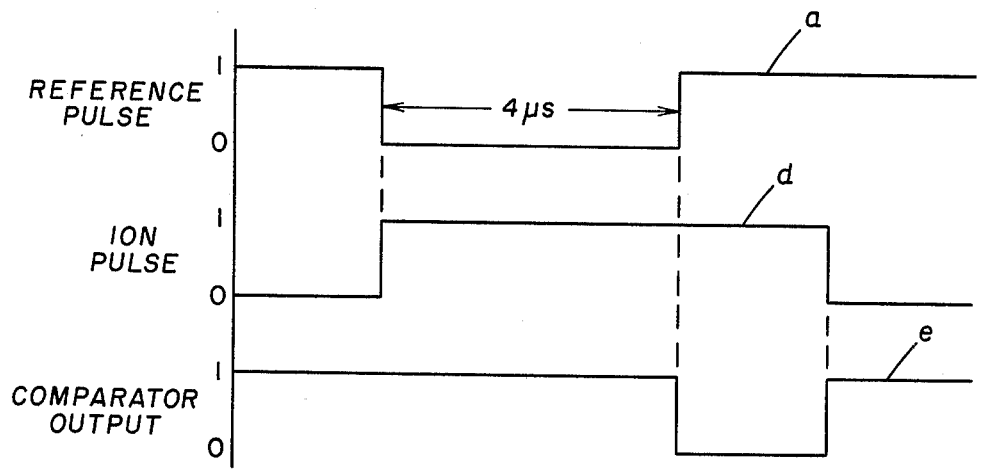
FIGS. 2 and 3 are a series of waveforms representative of the pulses appearing at the indicated points in the schematic of FIG. 1.

Referring now to the upper time limit of the time window, the comparator 33 operates to compare the ionization pulse time duration with the output of the multivibrator 30, representing the upper time limit. The upper time limit reference pulse from the multivibrator 30 is applied by way of inverter 35 to one input of the comparator 33. The ionization pulse from the output of NAND gate 28 is applied by way of inverter 34 to the other input of comparator 33. These two inputs to comparator 33 are illustrated in FIG. 3 as waveforms $a$ and $d$, respectively. The output of the comparator 33 is a negative-going pulse represented by the waveform $e$ in FIG. 3 only when the time duration of the positive-going ionization pulse $d$ exceeds the time duration of the negative-going reference pulse $a$.

The negative-going output pulse $e$ from the comparator 33 is applied by way of inverter 38 to the trigger input of pulse generator 40. In response to pulse $e$, generator 40 provides a positive-going pulse to the inverting input of operational amplifier 41. Operational amplifier 41 responds to pulse $e$ to produce a negative-going control signal indicating that the time duration of the ionization pulse is greater than the upper limit of the time window established by the multivibrator 30. This negative-going control signal is applied to the stepping motor 42. The motor 42 responds to the positive-going control signal to drive the variable autotransformer in a direction which increases the power applied from the 110-volt, a-c supply to the replenisher 15 of the accelerator tube 11, thereby decreasing the ionization of the accelerator gas.

It can be seen from the above description that the comparators 32 and 33 produce the output pulses $f$ and $e$, respectively, only under the circumstances wherein the time duration of the ionization pulse falls outside the lower or upper limits of the time window established by the lower and upper reference pulses from the multivibrators 31 and 30, respectively. Accordingly, the power supplied to the replenisher 15 is not adjusted each time the accelerator tube is fired but is adjusted only when the time duration of the ionization pulse produced during the firing of the accelerator tube falls outside such upper or lower limits of the time window. When the time duration of the ionization pulse falls within the limits of the time window, constant power is maintained to the replenisher element 15.

Having now described the regulator of the present invention in conjunction with the circuitry illustrated in FIG. 1, it is to be understood that such circuitry is merely representative of one embodiment. In accordance with such embodiment, the following sets forth specific types and values of the circuit components.

| Reference Designation | Description |
| --- | --- |
| Motor 42 | C43A113-1 (Globe) |
| Variable autotransformer 43 | 1HSO1UK (Superior) |
| Operational amplifier 41 | 741 (Fairchild) |
| One-shots 30 and 31 | MC677 Series (Motorola) |
| Generators 39 and 40 | MC677 Series (Motorola) |
| All NAND gates | MC672 Series (Motorola) |

I claim:

1. In a pulsed neutron system including an accelerator tube having a target, an ionization section, and a replenisher for supplying accelerator gas, a method of adjusting the power supplied to the replenisher to control the ionization time of the accelerator gas, comprising the steps of:
   a. monitoring the ionization time of the accelerator gas,
   b. establishing a time window having lower and upper limits greater than the nominal duration of said ionization time,
   c. increasing the power supplied to the replenisher upon the duration of said ionization time exceeding the upper limit of said time window to increase the amount of accelerator gas being supplied by the replenisher, thereby decreasing said ionization time, and
   d. decreasing the power supplied to the replenisher upon the duration of said ionization time falling below the lower limit of said time window to decrease the amount of accelerator gas being supplied by the replenisher, thereby increasing said ionization time.

2. The method of claim 1 wherein the power supplied to the replenisher is changed when the duration of the ionization time falls outside the range of about 2 to 4 microseconds.

3. In a pulsed neutron system including:
   a. an accelerator tube having a target, an ionization section, and a replenisher for supplying accelerator gas,
   b. means for generating an ionization pulse having the same time duration as the ionization time of the accelerator gas,
   c. means for generating first and second reference pulses in response to said ionization pulse, the time duration of said first reference pulse being greater than the nominal time duration of said ionization pulse and the time duration of said second reference pulse being less than the nominal time duration of said ionization pulse, and
   d. means for increasing the power supplied to the replenisher when the time duration of said ionization pulse exceeds the time duration of said first reference pulse, thereby decreasing the ionization time of the accelerator gas, and for decreasing the power supplied to the replenisher when the time duration of said ionization pulse is less than the time duration of said second reference pulse, thereby increasing the ionization time of the accelerator gas.

4. The system of claim 3 wherein said means for decreasing and increasing the power supplied to the replenisher includes:
   a. means for comparing said ionization pulse with said first reference pulse to provide a first control signal when the time duration of the ionization pulse exceeds the time duration of the first reference pulse,
   b. means for comparing said ionization pulse with said second reference pulse to provide a second control signal when the time duration of the ionization pulse is less than the time duration of the second reference pulse, and
   c. a control element responsive to said first control signal to increase the power supplied to said replenisher and responsive to said second control signal to decrease the power supplied to said replenisher.

5. The system of claim 4 wherein said control element includes:
   a. a stepping motor which steps in one direction in response to said first control signal and in an opposite direction in response to said second control signal, and
   b. a variable autotransformer coupled to said stepping motor for decreasing the power supplied to the replenisher when said motor steps in said one direction and for increasing the power supplied to the replenisher when said motor steps in said opposite direction.

6. The system of claim 3 wherein said first reference pulse is no greater than 4 microseconds in duration.

7. The system of claim 3 wherein said second reference pulse is no less than 2 microseconds in duration.

8. A pulsed neutron system comprising:
   a. an accelerator tube having a target, an ionization section, and a replenisher for supplying accelerator gas,
   b. a control element for varying the power supplied to said replenisher in response to a control signal,
   c. means for generating an ionization pulse having the same time duration as the ionization time of the accelerator gas,
   d. means for generating first and second reference pulses in response to said ionization pulse, the time duration of said first reference pulse being greater than the nominal time duration of said ionization pulse and the time duration of said second reference pulse being less than the nominal time duration of said ionization pulse, e. a first comparator to which said ionization pulse and said first reference pulse are applied, said first comparator providing a first comparison signal when the time duration of the ionization pulse exceeds the time duration of the first reference pulse, f. a second comparator to which said ionization pulse and said second reference pulse are applied, said second comparator providing a second comparison signal when the time duration of the ionization pulse is less than the time duration of the second reference pulse, and g. an operational amplifier having its two inputs respectively connected to the outputs of said first and second comparators for providing a control signal to said control element of (i) a first voltage state for increasing the power supplied to the replenisher upon the generation of said first comparison signal to thereby decrease the ionization time of the accelerator gas, (ii) a second voltage state for decreasing the power supplied to the replenisher upon the generation of said second comparison signal to thereby increase the ionization time of the accelerator gas, and (iii) a third voltage state for maintaining constant power to the replenisher in the absence of either said first or second comparison signal.

* * * * *

UNITED STATES PATENT OFFICE
CERTIFICATE OF CORRECTION

PATENT NO. : 3,984,694
DATED : October 5, 1976
INVENTOR(S) : Charles L. Dennis

It is certified that error appears in the above-identified patent and that said Letters Patent are hereby corrected as shown below:

Column 3, line 10, "which" should be --with--.
line 34, after "time" and before "drop" insert --should--.
line 56, "goingdescribed" should be -- going-described --.
line 61, after "tion" and before "pulse" insert --time of the accelerator gas in the tube 11. The ionization--.
Column 5, line 3, after "tion" and before "of" insert --time--.

Signed and Sealed this

Fourteenth Day of December 1976

[SEAL]

Attest:

RUTH C. MASON
*Attesting Officer*

C. MARSHALL DANN
*Commissioner of Patents and Trademarks*